United States Patent [19]

Vannier et al.

[11] Patent Number: 4,624,577
[45] Date of Patent: Nov. 25, 1986

[54] SCREW ELEMENT FOR A MATERIAL PROCESSING MACHINE

[75] Inventors: Jean Vannier, Etang sur Arroux; Francis Mourrier, Autun, both of France

[73] Assignee: Clextral, Paris, France

[21] Appl. No.: 713,111

[22] Filed: Mar. 18, 1985

[30] Foreign Application Priority Data

Mar. 16, 1984 [FR] France ............................. 84 04055

[51] Int. Cl.⁴ .............................................. B29B 1/10
[52] U.S. Cl. ..................................... 366/83; 198/677; 366/85
[58] Field of Search ...................... 366/88, 90, 82, 83, 366/89, 79, 80, 81, 84, 321, 322, 85; 425/206, 207, 208; 198/677, 842, 843

[56] References Cited

U.S. PATENT DOCUMENTS 3,977,515 8/1976 Lewoczko .................. 198/677
4,334,785 6/1982 Blach ......................... 366/322
4,416,544 11/1983 Blach ......................... 366/90
4,519,496 5/1985 Ludvigsen ................. 198/677

FOREIGN PATENT DOCUMENTS 347519 1/1922 Fed. Rep. of Germany ...... 198/677

Primary Examiner—Robert W. Jenkins
Attorney, Agent, or Firm—Pollock, Vande Sande & Priddy

[57] ABSTRACT

A screw element for use in a material-processing machine comprising at least one screw formed by a central driving shaft (2) on which are mounted a plurality of hollow elements (12, 13 . . . ) provided on their inner wall with grooves (31) engaging with corresponding splines (21) of the central shaft (2). A cylindrical inner collar (3) made from a product resistant to the mechanical driving stresses and on the inner wall (32) of which are formed the grooves (31) corresponding to the splines (21) of the shaft, and an outer collar (4) made from a product resistant to the abrasion of the processed material and on which are formed, within the body of the outer collar, helical threads (42) or other peripheral material-processing means, the outer collar (4) being mounted without clearance on the inner collar (3) and being connected to the inner collar for rotation therewith. The invention is applicable in particular to the construction of extruding machines.

10 Claims, 3 Drawing Figures

SCREW ELEMENT FOR A MATERIAL PROCESSING MACHINE

FIELD OF THE INVENTION

The invention relates to a screw element for use in a material-processing machine, for example a machine for extruding plastic material.

BACKGROUND OF THE INVENTION

An extruder normally comprises one or more screws driven in rotation inside an elongated sleeve in which cylindrical bores are formed for housing the screws. The latter are provided on their periphery with screw threads which drive toward the downstream end of the sleeve the material which is introduced through the upstream end of the sleeve. By acting on the pitches of the screws, the material may be subjected to trituration, compression and kneading effects, for example so as to produce polymerization in the case of granules of plastic material. The material is thus driven to the downstream end of the sleeve, which may be provided with an extrusion die or a simple outlet orifice in the case where the material does not have to be subjected to an extrusion.

In order to vary the processing achieved in the course of the advance of the material through the sleeve, the screws are formed with successive zones having threads of different pitches and shapes. For example, there may be employed conveying sections having a large pitch at the entrance of the machine so as to achieve a rapid driving of the material toward the downstream end, or along the sleeve so as to achieve an expansion or a de-gasing of the material. In other sections, the threads will have a smaller pitch or even a reverse pitch so as to retard and consequently compress the material. The threads having a reverse pitch may be provided with an opening controlling the passage of a certain amount of material toward the downstream end and increasing the trituration effect.

It is often necessary to modify the arrangement of the sections having different pitches, for example to change or adapt the processing procedure. Further, the threads may be deteriorated or subjected to a considerable wear, for example in the case where the material conveyed is particularly abrasive. This wear is obviously greater in the most compressed zones.

It is consequently necessary to be in a position to change or replace some sections of the screws and this is why these are usually formed by hollow juxtaposed elements mounted on a central shaft connected to a motor driving the shaft in rotation. In order to ensure that the rotation of the shaft is transmitted to the screw elements, the latter are provided on their inner wall with grooves which engage corresponding splines formed along the central shaft. In the course of rotation, the grooves are subjected to large shear forces and sometimes to blows, and the screw element must therefore be of a metal capable of resisting such forces. Further, the walls of the threads are subjected to an abrasion resulting from the driving of the material and, in order to increase their resistance to the abrasion, they are usually subjected to a surface treatment, for example by covering them with an anti-abrasion metal. This covering must be renewed periodically, and this operation is costly, especially as the wall of the threads must be machined with precision, for example in machines having two screws which engage each other.

SUMMARY OF THE INVENTION

An object of the invention is to provide a new manner of constructing screw elements which improves the resistance of the latter to abrasion.

The screw element according to the invention comprises a cylindrical inner collar made from a steel resisting the mechanical driving stresses, and carrying, on its inner wall, grooves corresponding to the splines of the shaft, and an outer collar made from a product capable of resisting the abrasion of the processed material and on which are formed the threads or other peripheral elements for processing the material, the outer collar being mounted without clearance on the inner collar to which it is connected so as to rotate therewith. For this purpose, the outer collar is preferably a shrink fit on the inner collar.

According to a preferred feature, the outer collar is made by a precision molding. it may, for example, be formed from an anti-abrasion alloy, such as a cobalt or nickel alloy.

BRIEF DESCRIPTION OF THE DRAWINGS

An embodiment of a screw element according to the invention is shown diagrammatically in the accompanying Figures.

FIG. 3 is a cross-sectional view taken on line 2—2 of FIG. 2.

DETAILED DESCRIPTION

Figure 1:
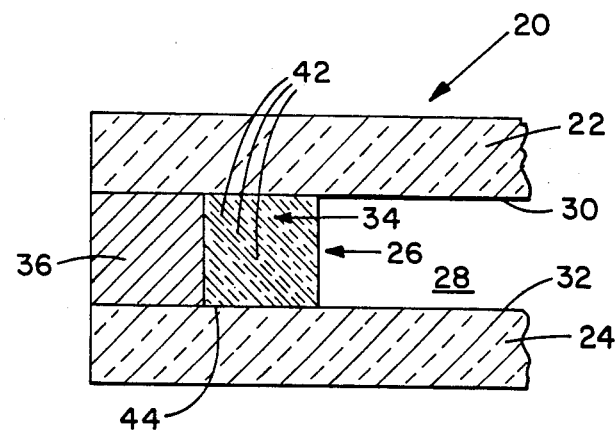
FIG. 1 is a diagrammatic axial sectional view of screw-threaded elements of two screws which engage one inside the other.

FIG. 1 shows a part of a processing machine comprising two screws 1 having parallel axes 10, engaged with each other and driven in rotation inside a sleeve 11 which surrounds them. Each screw is formed by a number of juxtaposed elements, such as 12, 13 and 14, which are mounted on a shaft 2 driven in rotation about its axis 10 by a means not shown in FIG. 1. For this purpose, the screw elements, such as 13, are provided with an inner bore in which are formed longitudinal grooves engaging on splines 21 on the shaft 2 so as to transmit the rotating torque to the screw-threaded elements.

Figure 2:
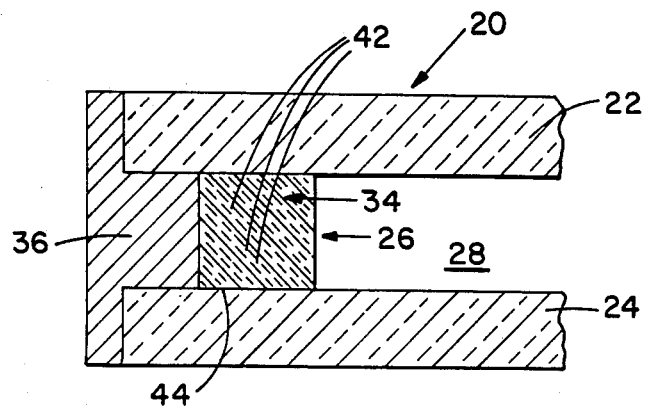
FIG. 2 is a detail view of the junction between two adjacent elements.

As can be seen in detail in FIGS. 2 and 3, each element, such as 13, comprises a cylindrical inner collar 3 surrounded by an outer collar 4.

The inner collar 3 is made from a steel capable of resisting the mechanical stresses due to the driving torque applied by the splines 21 of the shaft to the corresponding grooves 31 formed in the inner wall 32 of the collar 3.

The outer collar 4 is formed in a single piece by an anti-abrasion metal, such as an iron alloy or an alloy based on cobalt or nickel. It comprises a cylindrical body 41 on the periphery of which are formed within the body screw threads 42 or, in certain applications, other peripheral means for processing the material. The anti-abrasion metals are often little resilient and therefore offer poor resistance to the shear stresses which appear in the splines transmitting the torque. This is why the outer collar 4 is connected to rotate with the inner collar 3, for example by an interference fit or by adhesion, welding or brazing. On the other hand, the threads 42 are not subjected to large shear stresses since the pressure exerted by the material is distributed over the periphery of the thread so that the section of the latter can be moreover designed in consequence. This is why the thread 42 may be formed within the body of an anti-abrasive metal, even if such metals are not very ductile. On the other hand, owing to the fact that the outer collar is made entirely of an anti-abrasion metal, it is unnecessary to replace the screw elements as often as was previously the practice to re-constitute the thin anti-abrasion coating which, in the conventional constructions, covered the threads. Moreover often only the crests and flanks of the threads are covered, and not their roots, whereas, in the embodiment according to the invention, the whole of the thread resists abrasion. This is in particular advantageous in machines having two screws in which the root of the thread may also be subjected to much abrasion, in particular in the zones 15 of inter-engagement of the screws.

Another advantage resides in the fact that the outer collar 4 may be easily constructed by molding or casting. Indeed, the shape of the threads lends itself well to precision molding, for example by a lost wax method, or ceramic molding which gives the geometry of the part with a minimum of finishing machining. In these cases, only the central bore of the cylindrical body 41 need be produced by machining.

According to another advantageous feature of the invention, the inner collar 3 and the outer collar 4 are symmetrical relative to a median plane P of the element, and the inner collar 3 is a little shorter than the outer collar 4. In this way, there is defined at each end of the screw element a semi-groove 33 having a height equal to the thickness e of the inner collar 3 and a width a equal to one half of the difference between the lengths of the two collars. Thus, when the adjacent elements are placed in side-by-side relation, the two confronting semi-grooves 33 and 34 form an annular recess having a width 2a in which can be placed a circular sealing gasket 5 whose height corresponds to the thickness e of the inner collar less the depth of the grooves 31. The gaskets 5 and their recess are thus symmetrical relative to the plane $P_1$ of junction between the adjacent elements which, as they are themselves symmetrical, can be easily turned round after use so as to be used in the opposite direction.

The scope of the invention is not limited to the described embodiment, but also encompasses modifications within the scope defined by the claims. In particular, the embodiment just described of two concentric collars made from different metals could also be used when the material-processing means on the periphery of the element are not screw threads but are, for example, kneading arms or eccentric discs. Indeed, notwithstanding the initial increase in price resulting from the relatively large volume of anti-abrasion alloy, the method will be of interest in many cases, in particular when the wear produced by abrasion is very great, owing to the economy achieved in the course of operation, such as less frequent stoppages for demounting and renewing the anti-abrasion coating.

We claim:

1. A screw element for use in a material-processing machine comprising at least one screw which is driven in rotation inside an elongated sleeve and including a central driving shaft on which are mounted a plurality of hollow screw elements provided on their inner wall with grooves engaging corresponding splines on the central shaft and provided on their periphery with material-processing means, each said screw element comprising a cylindrical inner collar made from a product resisting mechanical driving stresses and an outer collar made from a product capable of resisting abrasion of the processed material, said inner collar and said outer collar being symmetrical relative to a median plane perpendicular to the axis of said shaft, and said inner collar having a length less than the length of said outer collar so as to define at both ends of said screw element two semi-grooves having a height equal to the thickness of said inner collar, so that confronting semi-grooves of two adjoining screw elements define a circular recess for a sealing gasket interposed between said adjoining screw elements.

2. A screw element according to claim 1, wherein said material-processing means on the outer collar are screw threads.

3. A screw element according to claim 1, wherein the outer collar is connected to rotate with the inner collar by an interference fit on the inner collar.

4. A screw element according to claim 1, wherein the outer collar is connected to rotate with the inner collar by adhesion between the collars.

5. A screw element according to claim 1, wherein the outer collar is connected to rotate with the inner collar by welding between the collars.

6. A screw element according to claim 1, wherein the outer collar is connected to rotate with the inner collar by brazing between the collars.

7. A screw element according to claim 1, wherein the outer collar is precision molded from a product resisting abrasion.

8. A screw element according to claim 1, wherein the outer collar is made from an anti-abrasion alloy.

9. A screw element according to claim 1, wherein said alloy is based on cobalt.

10. A screw element according to claim 1, wherein said alloy is based on nickel.

* * * * *